United States Patent
Lloyd et al.

(10) Patent No.: US 7,304,956 B2
(45) Date of Patent: Dec. 4, 2007

(54) EXTENDED WRAP MODE WITH SOURCE/DESTINATION WRAP

(75) Inventors: John Lloyd, Durham, NC (US);
Timothy James Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 10/118,296

(22) Filed: Apr. 8, 2002

(65) Prior Publication Data
US 2003/0189902 A1    Oct. 9, 2003

(51) Int. Cl.
*H04J 1/16* (2006.01)
*H04L 1/00* (2006.01)
*H04L 12/26* (2006.01)

(52) U.S. Cl. .............. 370/241; 370/242; 370/249

(58) Field of Classification Search ............. 370/241, 370/241.1, 242, 247, 248, 249, 251
See application file for complete search history.

(56) References Cited

U.S. PATENT DOCUMENTS

| | | | |
|---|---|---|---|
| 4,393,491 A * | 7/1983 | Ashlock et al. | 370/249 |
| 4,584,677 A | 4/1986 | Kosaka | 370/15 |
| 5,563,875 A | 10/1996 | Hefel et al. | 370/15 |
| 5,570,466 A * | 10/1996 | Oechsle | 709/238 |
| 5,668,800 A * | 9/1997 | Stevenson | 370/248 |
| 5,710,760 A | 1/1998 | Moll | 370/249 |
| 5,901,141 A | 5/1999 | Gruber et al. | 370/248 |
| 5,905,724 A | 5/1999 | Carson et al. | 370/385 |
| 5,933,435 A * | 8/1999 | Shah et al. | 714/749 |
| 5,940,375 A | 8/1999 | Soumiya et al. | 370/249 |
| 6,023,455 A | 2/2000 | Takahashi | 370/249 |
| 6,205,548 B1 * | 3/2001 | Hasbun | 713/2 |
| 6,279,124 B1 * | 8/2001 | Brouwer et al. | 714/38 |
| 6,643,286 B1 * | 11/2003 | Kapadia et al. | 370/389 |
| 6,873,599 B1 * | 3/2005 | Han | 370/249 |
| 7,194,535 B2 * | 3/2007 | Hannel et al. | 709/224 |
| 2003/0088664 A1 * | 5/2003 | Hannel et al. | 709/224 |

OTHER PUBLICATIONS

JP1245736 Publ. Sep. 29, 1989 Nakajima Mariko, "Communication Control Equipment".
JP1053652 Publ. Mar. 1, 1989 Takeyama Akira et al., "Packet Folding Device".

* cited by examiner

*Primary Examiner*—Edan Orgad
*Assistant Examiner*—Chuong Ho
(74) *Attorney, Agent, or Firm*—Sawyer Law Group LLP

(57) ABSTRACT

Apparatus and method for automatically testing hardware and software components of a system. A request type message is generated in the software component of the system. A request-type message, including a destination address and a source address, is made to traverse the transmit channel of the system. The destination address and source address are swapped, i.e., interchanged, and the message is wrapped into the receive channel where it is forwarded to the software component for further analysis. Modification is in the transmit channel to modify the message by swapping the source address and the destination address to preclude discarding of the message by the receive channel.

15 Claims, 2 Drawing Sheets

EXTENDED WRAP MODE WITH SOURCE/DESTINATION WRAP

BACKGROUND OF THE INVENTION

1. Field of the Invention

This invention relates to self testing in a computer communication system using wrap-around to send a test message to itself to verify that components of the system are operating properly. More particularly, it relates to swapping destination and sender addresses in the transmit path to preclude the system protocol from discarding the test message in the receive path.

2. Description of the Related Art

The use of wrap-around to test the transmitting and receiving processes in a networking system is well known. Some mechanism for coupling a transmitted signal back into the receiving port of the system is provided, which can be direct hardware coupling or a program-operated switching arrangement.

If the system being tested has a plurality of software and hardware levels and the messages are complex and cast in frames, strict protocols must be adhered to. One of the formal protocols is detecting the address of an incoming message and rejecting the message if it is not addressed to the receiving system.

The system protocols require an external destination address in order for the message to exit via the transmit output ports. The system protocol then detects that the wrapped message is not addressed to the system under test and discards it.

To overcome this problem when using wrap-around to test system components, manual intervention or custom software are used.

BRIEF SUMMARY OF THE INVENTION

This invention is directed to the efficient and automatic use of self-testing in systems capable of communication In accordance with the invention, a system which includes message generators—the messages containing source addresses and destination addresses—with the capability of transmitting and receiving messages, is provided with a wrap-around capability to connect together the ports for transmitting and receiving messages so that the system can receive messages it transmits. To prevent discarding of messages because the destination address is incorrect, there is a swapping capability included in said transmission portion of the system to interchanging source addresses and destination addresses in messages.

In one implementation of the invention, the swapping capability is incorporated in a driver device that couples the messages to the transmission components A hardware implementation can employ multiplexors to selectively interchange the source and destination addresses of messages, the multiplexors being activated simultaneously with activation of the wrap-around capability.

BRIEF DESCRIPTION OF THE DRAWING

The invention is described in detail by referring to the various figures which illustrate specific embodiments of the invention, and wherein like numerals refer to like elements.

DETAILED DESCRIPTION OF THE INVENTION

When testing networking system hardware components using wrap-around or message wrap, a user sends out a test message which is then received back into the user's system. Comparing the outgoing message with the incoming message, hardware failures can be detected. This permits a system to be tested in isolation, i.e., without tying up other stations on the networking system.

Typically, a software process is used to generate data from a control point in the system. The data flows through the software stack of the system and through the hardware components of the system in the direction of the transmit interface until it reaches the point where a wrap has been inserted. A wrap can be implemented by a hardware loop using a special software selective mode or by an external means.

At the wrap point, the data enters the receive path of the system in the direction of the software stack. A user skilled in the art knows that the wrapped data from the transmit path to the receive path is not modified by the wrap mechanism. As a result, the embedded destination address in the data, which is that of an external element, remains the same after the wrap. This causes the data or message packet to be discarded before it reaches a software system component that can verify the integrity of the test data.

Typically, modifications are added to the receive path of the system to display the data before it is discarded. The user then must verify the data integrity manually or by writing a custom software program. This is time consuming and subject to error.

The invention described herein performs an address swap by exchanging the positions of the destination address and the source address in the data test message. This can be done anywhere along the transmit path before the wrap point. Thus, the destination address in the message packet is the source address which is the address of the system being tested. As a result, data verification testing can be performed by system processing in a normal manner using automatic verification.

This approach is applicable to any system having input and output communication ports but is especially useful with a message protocol of a request/reply nature. In this case, the system under test generates a reply in response to the wrapped data received. This reply is then wrapped back. This checks system operation in both directions.

Address swapping can be performed in any of the transmit path components. A preferable point is the final action of the software stack before the data enters the hardware components that transmit the data.

Figure 1:
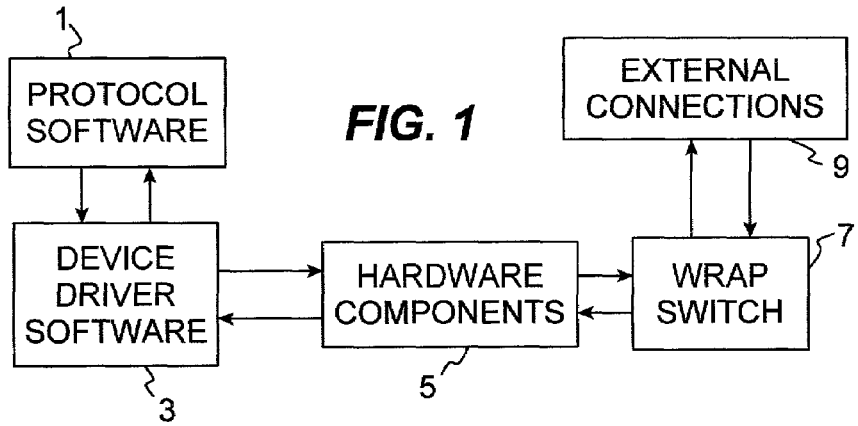
FIG. 1 is a block diagram of a network terminal system in which the invention is used.

FIG. 1 shows the components of a system useful in practicing the invention. The protocol in a software component 1 generates the test data including a source address, a destination address, and a packet of test data. The test message is represented by a triplet as <D,S,P> where D denotes some external destination address, S denotes the source (user's) address, and P is the test data or payload which is determined by the user.

A device driver software component 3 interfaces with hardware components 5 that are required to transmit the data. A wrap switch 7 is used either to send the message on to external connections 9 in a normal mode or to wrap the message back in a test mode to the hardware components 5 required for receiving the test data.

If the protocol is a request/reply types then the protocol software 1 can terminate the request and generate a reply which is then wrapped again to the receiver port. In this way, the entire system can be tested In the absence of the method according to the invention, the data in the test mode is passed from the device driver software 3 to the hardware components 5 unchanged. Thus, when the data is received by the hardware components 5 via the wrap switch 7, it does not contain as the destination address the address of the system under test. The protocol software 1 then discards the message as passed to it by the device driver software 3.

Using the method of the invention, the source address and the destination address are swapped when the data is passed from the protocol software 1 through the device driver software 3 to the hardware components 5 during the transmit phase of the test.

Figure 2:
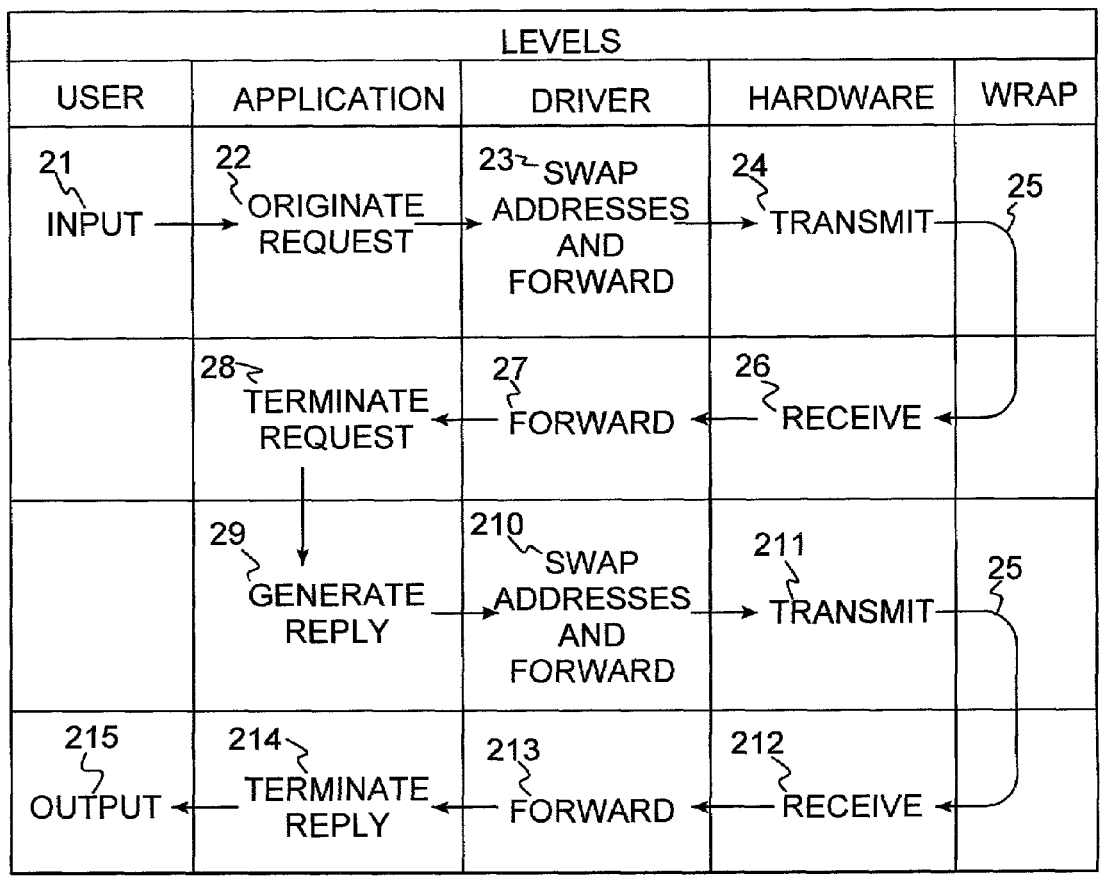
FIG. 2 is an level-vs-event diagram showing the sequence of actions according to the invention.

The following is a pseudo-code description of the invention and is keyed to the reference numerals of FIG. 2. The figure shows the chain of events according to the system levels, viz., the user level, the application program level, the device driver software level, the hardware level, and the wrap level. The latter can be manually connected or switched by software commands.

1. User input to test system (21)
2. Application originates request message $M_1=<D,S,P_1>$ (22)
3. $M_1$ is passed to driver level
4. Driver creates $M_2=<S,D,P_1>$ (23)
5. $M_2$ forwarded to hardware components
6. $M_2$ transmitted via system output port (24)
7. $M_2$ routed to system input port by wrap mechanism (25)
8. $M_2$ received by system (26)
9. $M_2$ forwarded by driver to application level (27)
10. Application terminates request (28)
11. Application generates reply message $M_3=<D,S,P_2>$ where $P_2=f(P_1)$ (29)
12. $M_3$ passed to driver
13. Driver creates $M_4=<S,D,P_2>$ (210)
14. $M_4$ forwarded to hardware components
15. $M_4$ transmitted via system output port (211)
16. $M_4$ routed to system input port by wrap mechanism (25)
17. $M_4$ received by system (212)
18. $M_4$ forwarded to by driver to application level (213)
19. Application terminates reply (214)
20. Output to user level (215)

At step 11, the generation of $P_2$ as a function of $P_1$ is based on the specific configuration of the application. Correct configuration of the application as well as correct operation of all components can be verified by examining output to the user.

Figure 3:
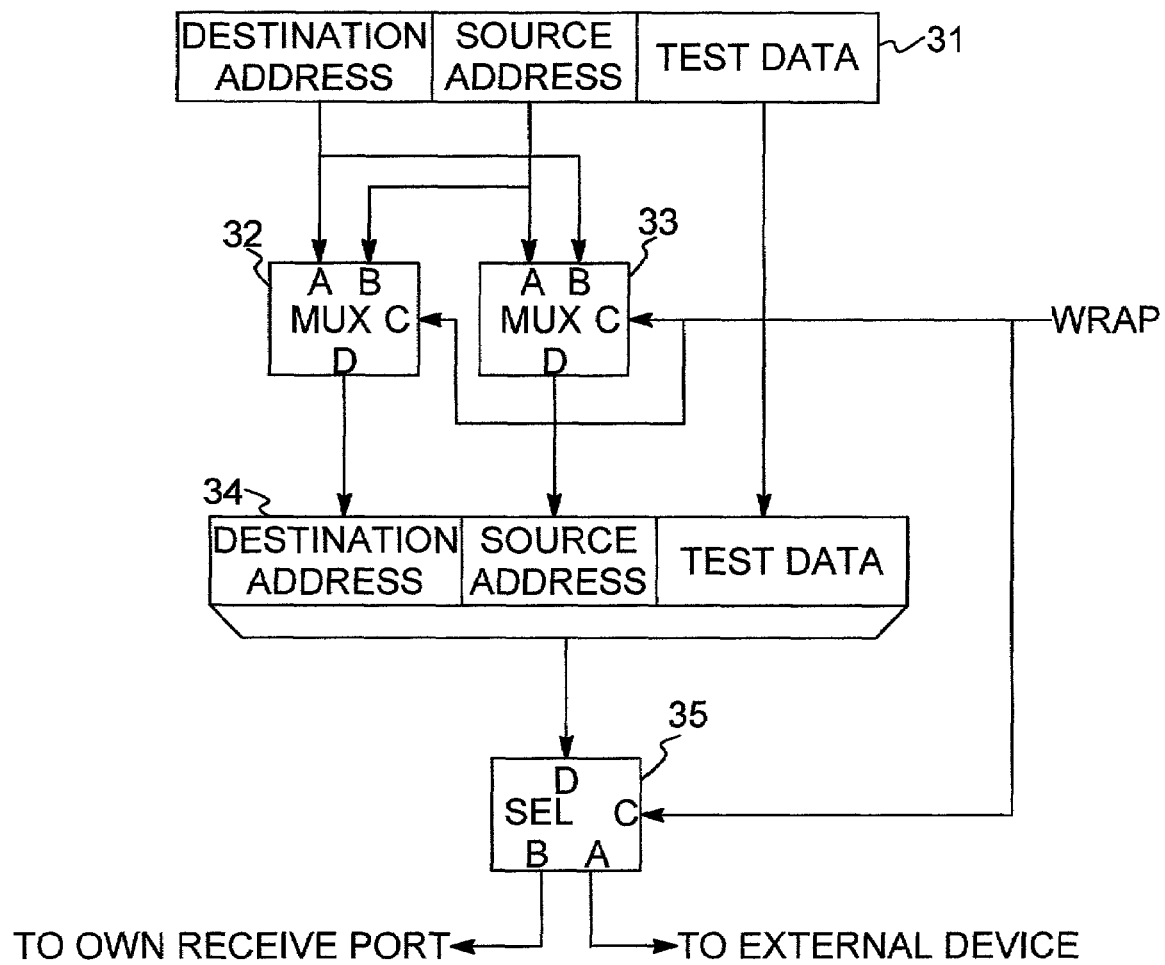
FIG. 3 is a block logic diagram illustrating a hardware implementation of the invention.

FIG. 3 shows a hardware implementation of the invention. The destination and source addresses of a test message 31, either the request or reply message, are coupled to a pair of multiplexors 32 and 33. The multiplexors pass the A input signals to the output terminal D when the control input signal C is not activated. When the control input signal C is activated, the B input signals are passed to the output terminal D. The test data portion, P in the above description, is passed unchanged.

Thus, when the wrap signal is not active, the destination address of the test message 31 is passed to destination address of an outgoing message 34 by the multiplexor 32. The source address of the test message 31 is passed to the source address of the the outgoing message 34 by the multiplexor 33.

When the wrap signal is active, the source address of the test message 31 is passed to the destination address of the outgoing message 34 by the multiplexor 32 and the destination address of the test message 31 is passed to the source address of the outgoing message 34 by the multiplexor 33.

The outgoing message 34 is coupled to an input terminal D of a selector 35. When the control signal C is not activated, the input signals from the input terminal D are passed to the output terminal A. When the control signal C is activated, the input signals at the input terminal D are passed to the output terminal B. The signals from the output terminal A of the selector 35 are directed to the network communication connections to the external devices. The signals from output terminal B of the selector 35 are connected to the input terminals of the receive ports of the system under test.

Thus, when the wrap signal is not active, the system output signals are connected to the network with the source and destination addresses unchanged. When the wrap signal is active, the system output signals are wrapped back into the receive terminals of the system under test with the source and destination addresses interchanged.

The operation of the system according to the invention is the same whether implemented in hardware or in software.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. A communication device comprising:
    a component for generating messages containing source addresses and destination addresses;
    a transmission component for transmitting messages;
    a reception component for receiving messages;
    a selector component for selectively wrapping transmitted messages from the transmission component of the communication device to the reception component of the communication device; and
    a swapping component included in said transmission component for selectively interchanging source addresses and destination addresses in the transmitted messages before the transmitted messages are wrapped by the selector component, wherein the swapping component includes a control signal mechanism for activating said selector component and said swapping component at the same time.

2. The communication device of claim 1 further including a driver component for coupling signals from the component for generating messages to the transmission component and wherein said swapping component is included in the driver component.

3. The communication device of claim 1 wherein said swapping component includes a multiplexor for selectively interchanging the source addresses and destination addresses of a message.

4. The communication device of claim 1 further comprising a reply component that generates a reply message upon receiving a wrapped message, wherein the reply message is transmitted by the transmission component and wrapped to the reception component by the selector component.

5. The communication device of claim 1 wherein the selector component includes a wrap switch that selectively wraps transmitted messages from the transmission component to the reception component of the communication device.

6. The communication device of claim 5 wherein the wrap switch is positioned between hardware components and external connections in a transmit path of the communication device.

7. The communication device of claim 1 wherein the transmission component is operative to transmit messages over a communication link external to to the communication device, and wherein the selector component is operative to selectively wrap transmitted messages from the transmission component of the communication device to the reception component of the communication device without the messages being transmitted on the external communication link.

8. A method of self-test of a system capable of communication comprising the steps of:
originating a test message which includes a source address and a destination address;
passing the test message via a transmission channel;
selectively swapping the source address and destination address in the transmission channel using a swapping component;
transmitting the test message via an output port;
selectively wrapping the output port of the system to the receiving port using a selector component such that the test message with swapped addresses is received at the receiving port, wherein a control signal mechanism in the swapping component activates the selector component and the swapping component at the same time; and
verifying the integrity of the received test message to establish the system is error free.

9. The method of claim 8 including the steps of:
generating a reply message upon receipt of the test message; and
repeating the steps of claim 4 with the reply message.

10. The method of claim 8 wherein the swapping of the source address and destination address in the transmission channel is the final action of a software stack before the test message enters hardware components that transmit the test message.

11. The method of claim 8 wherein said swapping component includes a multiplexor for selectively interchanging the source addresses and destination addresses of the test message.

12. The method of claim 8 wherein the system is capable of communication over a communication link external to the system, and wherein the selector component selectively wraps the output port of the system to the receiving port such that the test message with swapped addresses is received at the receiving port without being transmitted on the external communication link.

13. A system comprising:
means for generating messages containing source addresses and destination addresses;
transmission means for transmitting messages;
reception means for receiving messages;
selector means for selectively routing messages from the transmission means to the reception means; and
swapping means included in said transmission means for interchanging source addresses and destination addresses in messages, wherein said swapping means includes
multiplexor means for selectively interchanging the source addresses and destination addresses of a message; and
control signal means for activating said selector means and said swapping means at the same time.

14. An apparatus for testing a communication device operative to communicate over a communication link external to the apparatus, the apparatus comprising:
a swapping component for selectively interchanging source addresses and destination addresses in messages to be transmitted by a transmission component of the communication device; and
a selector component for selectively wrapping the messages with the interchanged source addresses and destination addresses, the messages being wrapped from the transmission component of the communication device to a reception component of the communication device without being transmitted on the external communication link, wherein the reception component is operative to receive messages, wherein said swapping component includes:
a multiplexor for selectively interchanging the source addresses and destination addresses of the messages; and
a control signal mechanism for activating said selector component and said swapping component at the same time.

15. The apparatus of claim 14 further comprising a reply component that generates a reply message upon receiving a wrapped message, wherein the reply message is transmitted by the transmission component and wrapped to the reception component by the selector component.

* * * * *